US010676034B2

(12) United States Patent
Porcs

(10) Patent No.: US 10,676,034 B2
(45) Date of Patent: Jun. 9, 2020

(54) STORAGE COMPARTMENTS HAVING SLIDING TRAYS OF CONSOLE ASSEMBLIES FOR VEHICLES

(71) Applicant: Toyota Motor Engineering & Manufacturing North America, Inc., Erlanger, KY (US)

(72) Inventor: Robert A. Porcs, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 161 days.

(21) Appl. No.: 15/630,388

(22) Filed: Jun. 22, 2017

(65) Prior Publication Data

US 2018/0370444 A1 Dec. 27, 2018

(51) Int. Cl.
*B60R 7/04* (2006.01)
*B60N 2/75* (2018.01)
*B60R 11/00* (2006.01)

(52) U.S. Cl.
CPC ................ *B60R 7/04* (2013.01); *B60N 2/793* (2018.02); *B60R 2011/0007* (2013.01); *B60R 2011/0043* (2013.01)

(58) Field of Classification Search
CPC .............. B60N 2/793; B60R 7/04; B60R 7/06
USPC ................................. 296/24.34, 37.8, 37.12
See application file for complete search history.

(56) References Cited

U.S. PATENT DOCUMENTS

| | | | | |
|---|---|---|---|---|
| 5,372,403 | A | 12/1994 | Puerto | |
| 5,673,891 | A | 10/1997 | Fujihara et al. | |
| 6,851,736 | B1 * | 2/2005 | Klopp, III | B60R 7/04 224/926 |
| 8,322,671 | B2 | 12/2012 | Myers et al. | |
| 8,783,752 | B2 * | 7/2014 | Lambert | B60R 16/02 296/24.34 |
| 9,975,493 | B2 * | 5/2018 | Okinaga | B60R 7/04 |
| 2005/0189776 | A1 * | 9/2005 | Sturt | B60N 3/102 296/24.34 |
| 2009/0174207 | A1 * | 7/2009 | Lota | B60R 7/04 296/24.34 |
| 2009/0278370 | A1 * | 11/2009 | DePue | B60N 2/793 296/24.34 |
| 2013/0257078 | A1 * | 10/2013 | Quijano | B60R 7/04 296/24.34 |
| 2013/0258604 | A1 * | 10/2013 | Quijano | B60R 7/04 361/725 |

(Continued)

FOREIGN PATENT DOCUMENTS

JP 4545338 B2 9/2010

*Primary Examiner* — Jason S Daniels
(74) *Attorney, Agent, or Firm* — Dinsmore & Shohl LLP

(57) ABSTRACT

A storage compartment of a console assembly for a vehicle includes a housing and a sliding tray. The housing includes a storage area defined by a floor, a pair of sidewalls and a pair of end walls. The housing includes an opening permitting access to the storage area. Each of the pair of sidewalls includes a track. The sliding tray includes an upper storage surface, a bottom wall, and a pair of sidewalls that extend upwardly from side edges of the bottom wall beyond at least a portion of the upper storage surface. Each of the pair of sidewalls includes an outwardly extending rail that engages with the track on each of the pair of sidewalls of the housing to permit the sliding tray to slide with respect to the housing.

20 Claims, 5 Drawing Sheets

(56) References Cited

U.S. PATENT DOCUMENTS

| | | | | |
|---|---|---|---|---|
| 2014/0197657 | A1* | 7/2014 | Gillis | B60R 7/04 296/37.8 |
| 2015/0217667 | A1 | 8/2015 | Senda | |

* cited by examiner

STORAGE COMPARTMENTS HAVING SLIDING TRAYS OF CONSOLE ASSEMBLIES FOR VEHICLES

TECHNICAL FIELD

The present specification generally relates to storage compartments for console assemblies of vehicles and, more specifically, to storage compartments having sliding trays.

BACKGROUND

Passenger compartments of vehicles may be equipped with console assemblies having storage compartments located between a driver's seat and a front passenger's seat. The storage compartments often include a sliding tray that engages with a track formed in the storage compartment such that the sliding tray slides with respect to the storage compartment to allow access to a storage area. As the track is positioned in sidewalls of the storage compartment at a position below an upper surface of the sliding tray, a gap is formed between the sliding tray and sidewalls of the storage compartment.

Increasingly, occupants place various objects on the upper surface of the sliding tray for use as a supplemental storage area. During operation of the vehicle, objects placed on the upper surface of the sliding tray may shift and become lodged in the gap preventing the movement of the sliding tray and access to the storage area.

Accordingly, there is a need for storage compartments of console assemblies capable of preventing objects from becoming lodged between the sliding tray and the sidewalls of the storage compartment.

SUMMARY

In accordance with one embodiment, a storage compartment of a console assembly for a vehicle is provided. The storage compartment includes a housing, and a sliding tray. The housing includes a storage area defined by a floor, a pair of sidewalls and a pair of end walls. The housing includes an opening permitting access to the storage area. Each of the pair of sidewalls includes a track. The sliding tray includes an upper storage surface, a bottom wall, and a pair of sidewalls that extend upwardly from side edges of the bottom wall beyond at least a portion of the upper storage surface. Each of the pair of sidewalls includes an outwardly extending rail that engages with the track on each of the pair of sidewalls of the housing to permit the sliding tray to slide with respect to the housing.

In accordance with another embodiment, a vehicle is provided. The vehicle includes a passenger compartment and console assembly. The console assembly includes a storage compartment within the passenger compartment. The storage compartment includes a housing, and a sliding tray. The housing includes a storage area defined by a floor, a pair of sidewalls and a pair of end walls. The housing includes an opening permitting access to the storage area. Each of the pair of sidewalls includes a track. The sliding tray includes an upper storage surface, a bottom wall, and a pair of sidewalls that extend upwardly from side edges of the bottom wall beyond at least a portion of the upper storage surface. Each of the pair of sidewalls includes an outwardly extending rail that engages with the track on each of the pair of sidewalls of the housing to permit the sliding tray to slide with respect to the housing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Figure 1:
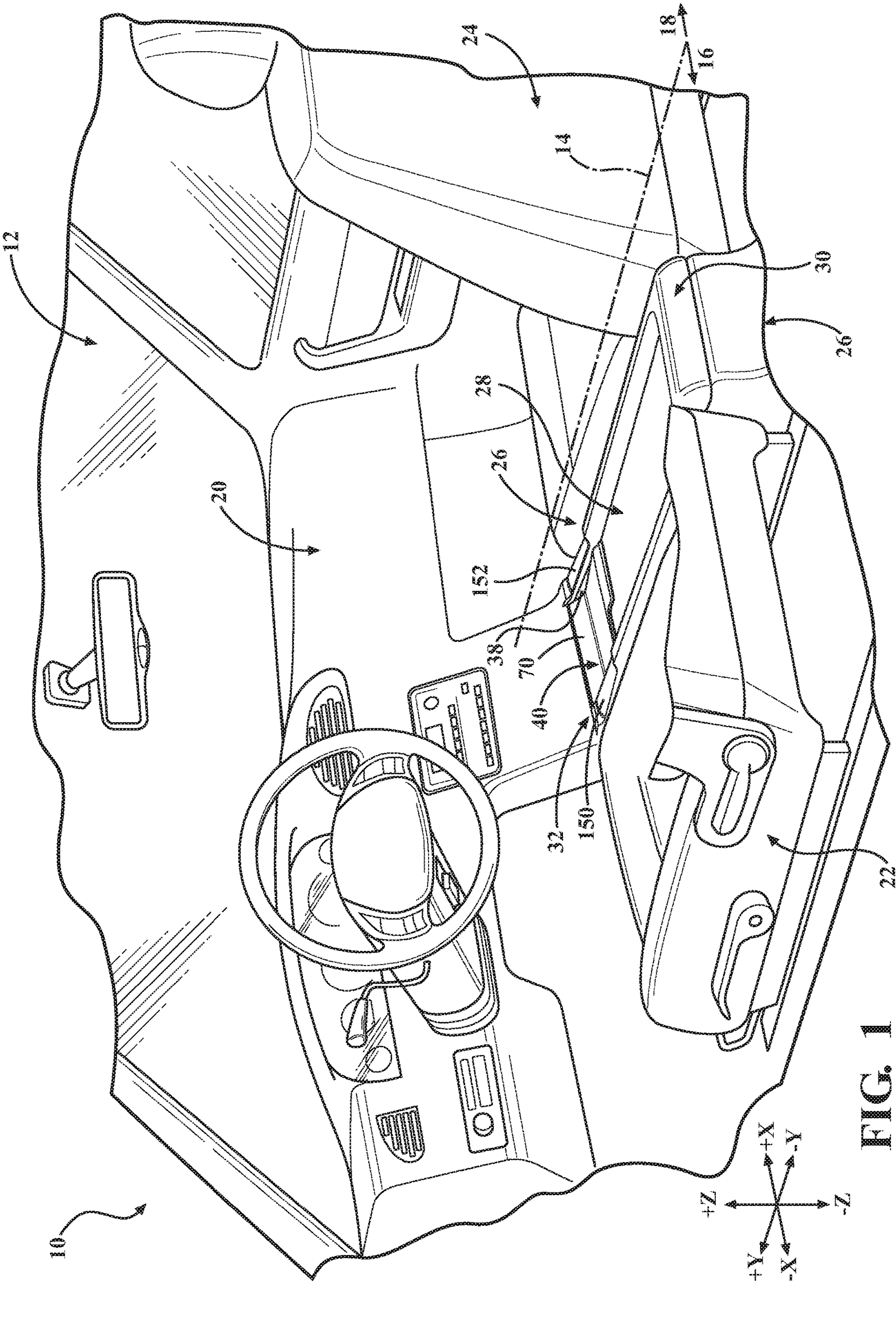
FIG. 1 schematically depicts a partial perspective view of a passenger compartment for a vehicle having a console assembly having a storage compartment with a sliding tray in a closed position, according to one or more embodiments described and illustrated herein.

Vehicles according to the present specification include a passenger compartment having an instrument panel and at least two seats, a driver seat and a front passenger seat. Between the driver seat and the passenger seat, and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly includes a storage compartment. The storage compartment includes a housing that has a floor, a pair of sidewalls, and a pair of end walls so as to define a storage area. The housing includes an opening permitting access to the storage area. Further the storage compartment includes a sliding tray. The sliding tray is operably connected to a track provided on an inner surface of each of the pair of sidewalls of the housing. Each of the tracks are configured to define a rail receiving cavity.

The sliding tray of the storage compartment may include an upper storage surface, a bottom wall, and a pair of sidewalls. The pair of sidewalls extend upwardly from side edges of the bottom wall in a vehicle vertical direction so that the sidewalls extend beyond at least a portion of the upper storage surface. Each of the pair of sidewalls includes a rail that extends outwardly and perpendicular to the pair of sidewalls. The rails are configured to engage with the tracks to permit the sliding tray to slide with respect to the housing.

The sliding tray may include a tray cover and a separate tray body. The tray cover includes the upper storage surface and the tray body includes the bottom wall, the pair of sidewalls, and the rails. The sliding tray slides with respect to the pair of sidewalls in a vehicle longitudinal direction. The tray cover further includes a pair of side edges and is positioned on the tray body such that at least a portion of the pair of side edges abut interior surfaces of the sidewalls of the tray body. The tray body further includes a rib that extends inwardly from the interior surfaces of the sidewalls in a vehicle lateral direction. The side edges of the tray cover contact the ribs of the tray body. The ribs of the tray body correspond to a generally curvilinear shape of the tray cover to allow the tray cover to seat on the ribs.

The sliding tray slides with respect to the housing in a vehicle longitudinal direction between a closed position and an opened position. In the closed position, the sliding tray covers the opening and prevents access to the storage area. In the open position, the sliding tray is removed from the opening to permit access to the storage area.

The embodiments disclosed herein may be configured to prevent objects placed on the upper storage surface of the sliding tray from becoming lodged between the sliding tray and the sidewalls of the housing. Inhibiting objects from entering a space between the sliding tray and the housing avoids the occurrence of the objects becoming lodged therein which can prevent movement of the sliding tray. If the sliding tray is prevented from sliding with respect to the housing, a user can be prevented access to the storage area. Therefore, the embodiments disclosed herein provide for the sliding tray to include sidewalls that extend upwardly from side edges of the bottom wall beyond at least a portion of the upper storage surface. As such, objects placed on the upper storage surface contact the sidewalls that extend upwardly beyond at least a portion of the upper storage surface. Accordingly, the objects are prevented from entering a space between the sidewalls of the housing and the sliding tray by the sidewalls that extend upwardly beyond at least a portion of the upper storage surface.

Various embodiments of the console assembly for the passenger compartment of the vehicle will be described in more detail herein.

It should be appreciated that the console assembly may be provided at any suitable position within a vehicle, such as between a pair of front row seats, a pair of second or third row rear seats, etc. The console assembly may be provided with an interior cavity utilized as a storage compartment. The console assembly is typically provided within a center console of a vehicle as described above. While the embodiments described herein are described in reference to a console assembly having an interior cavity used as a storage area, the embodiments are not limited thereto. For example, in some embodiments, the storage area of the console assembly may include, without limitation, alternative vehicle accessories such as receptacles (e.g., a cup holder), ashtrays, electronic components, HVAC, and/or audio component controls, etc.

In some embodiments, the storage compartment is fixedly secured to the console assembly. However, the embodiments are not limited thereto. For example, in some embodiments, the storage compartment may be releasably attached to the console assembly for movement between console assemblies positioned between pairs of first row seats, second row seats, and third row seats of a vehicle.

As used herein, the term "vehicle longitudinal direction" refers to the forward-rearward direction of the vehicle (i.e., in the +/−vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in direction 16 with respect to a vehicle centerline 14. The term "inboard" or "inward" as used herein refers to the relative location of a component in direction 18 with respect to the vehicle centerline 14. Because the vehicle structures may be generally symmetrical about the vehicle centerline 14, the direction to which use of terms "inboard," "inward," "outboard" and "outward" refer may be mirrored about the vehicle centerline 14 when evaluating components positioned along opposite sides of the vehicle 10.

Referring initially to FIG. 1, a partial perspective view of a passenger compartment 12 of a vehicle 10 is depicted. The passenger compartment 12 includes a driver area and a passenger area.

An instrument panel 20 is provided within the passenger compartment 12. The instrument panel 20 generally extends in the vehicle lateral direction and includes, without limitation, an instrument cluster, a radio, and a climate control cluster including a plurality of individual vents. Further, the passenger compartment 12 includes a driver seat 22 and a front passenger seat 24. Located adjacent the driver seat 22 are the controls to the vehicle 10 such as, without limitation, a steering wheel, a gas pedal, and a brake pedal. It should be appreciated that the passenger compartment 12 may include a plurality of passenger seats rearward of the front passenger seat 24 in a vehicle longitudinal direction.

Generally, between the driver seat 22 and the front passenger seat 24 is a console assembly 26. The console assembly 26 generally extends in the vehicle longitudinal direction extending from the instrument panel 20 ending at or slightly beyond a rear surface of the driver seat 22 and the front passenger seat 24. Further, the console assembly 26 generally extends in the vehicle lateral direction an equal distance outwardly from the vehicle centerline 14, limited in width by the distance between the driver seat 22 and the front passenger seat 24. The console assembly 26 includes a forward portion 28 and a rearward portion 30, the forward portion 28 being closer to the instrument panel 20 than the rearward portion 30. Disposed within the forward portion 28 of the console assembly 26 is a storage compartment 32.

The storage compartment 32 may be integrated with the console assembly 26. In some embodiments, the storage compartment 32 is integrated with the console assembly 26 and the instrument panel 20. In some other embodiments, the storage compartment 32 may be separated from the console assembly 26, the instrument panel 20, or both.

Figure 2:
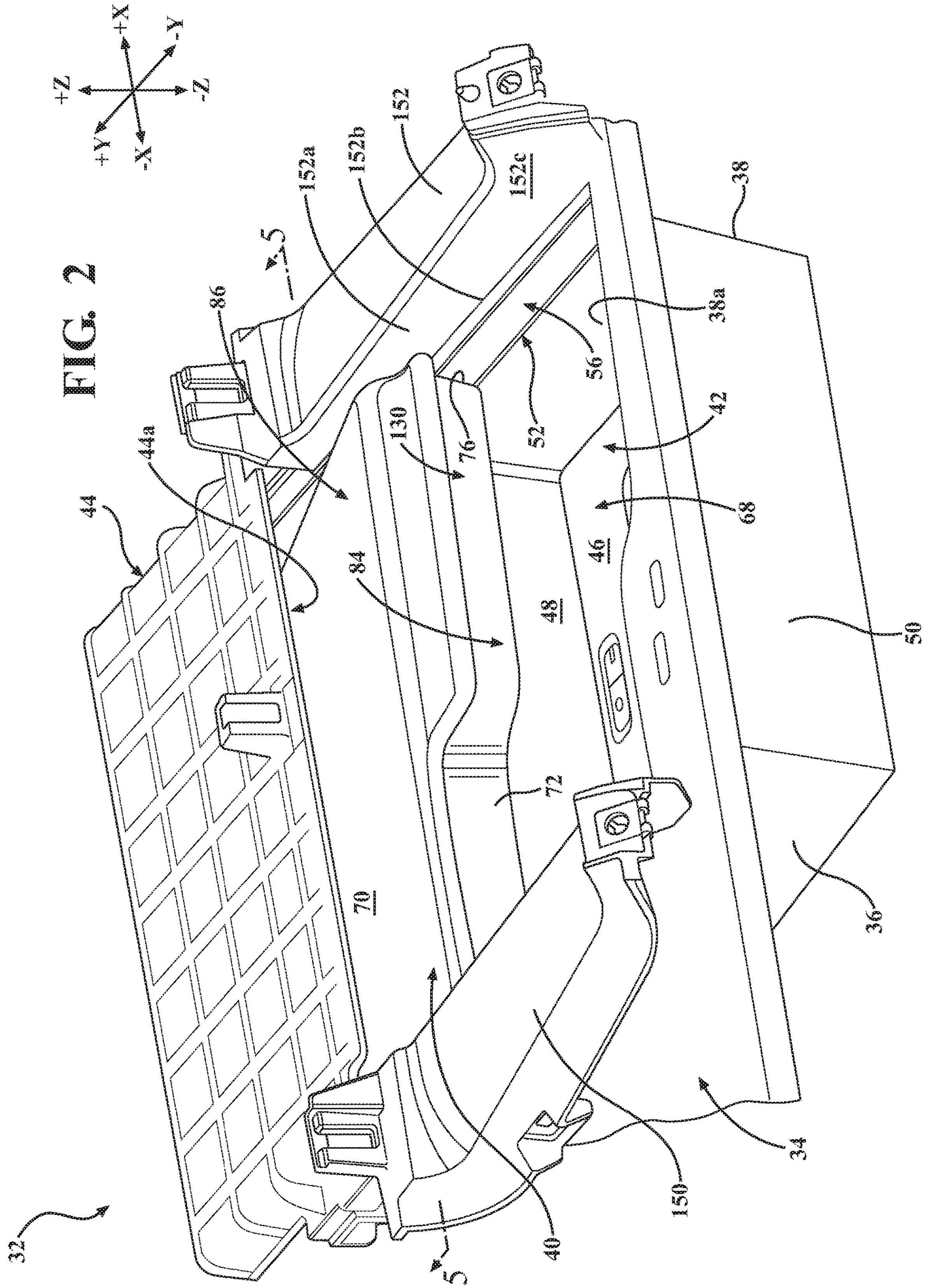
FIG. 2 schematically depicts a front perspective view of the storage compartment of the console assembly of FIG. 1 in an open position in isolation, according to one or more embodiments described and illustrated herein.
Figure 5:
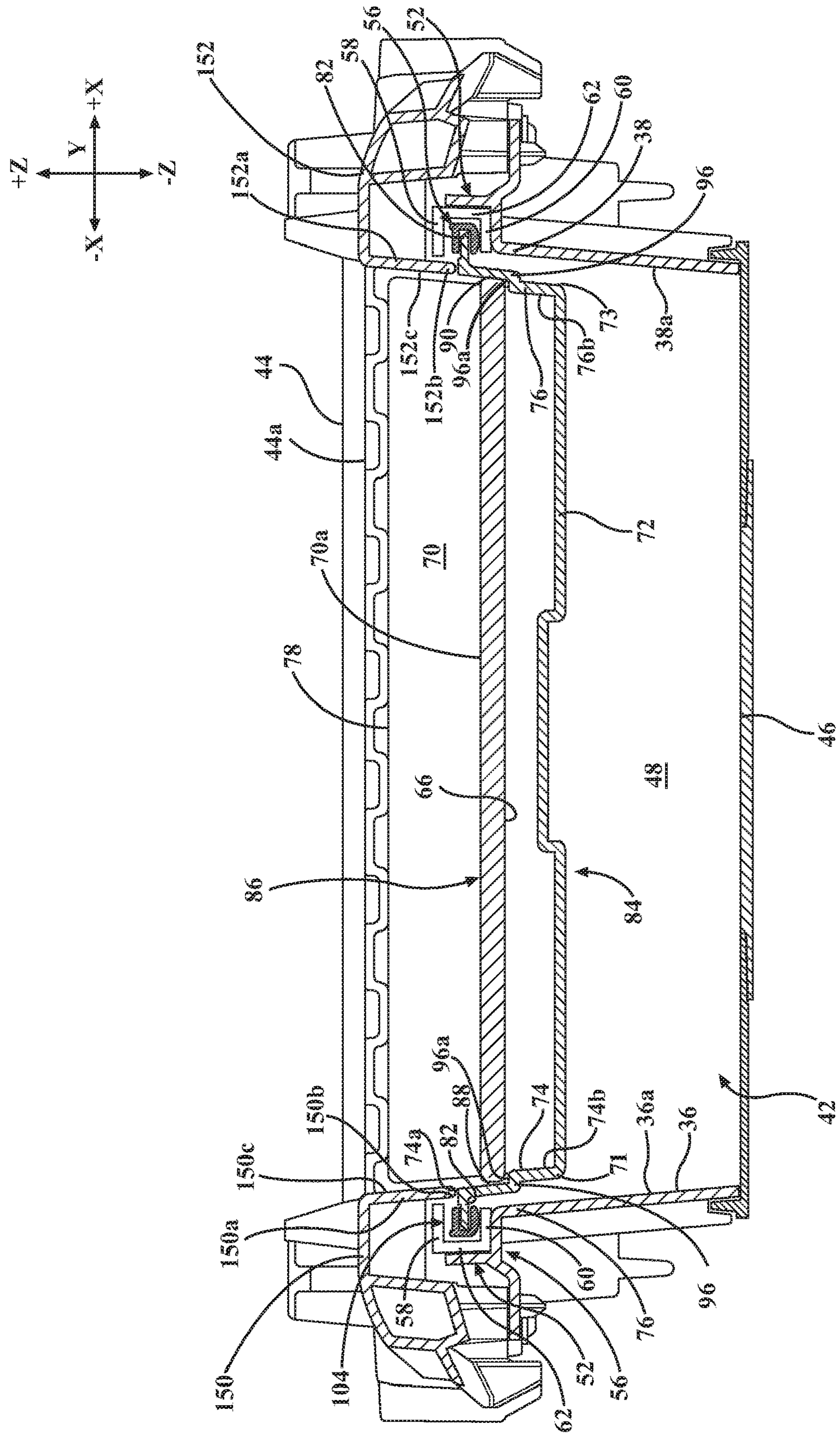
FIG. 5 schematically depicts a cross section of a front view of the console assembly of FIG. 2 taken along line 5-5 of FIG. 2, according to one or more embodiments described and illustrated herein.

Referring to FIGS. 2 and 5, the storage compartment 32 includes a housing 34 and a sliding tray 40. As will be described in greater detail below, the sliding tray 40 is slidable with respect to the housing 34 between a closed position, as shown in FIG. 1, and an open position, as shown in FIG. 2.

The housing 34 includes a pair of sidewalls 36 and 38, a floor 46, and a pair of end walls 48, 50. The pair of sidewalls 36 and 38, the floor 46, and the pair of end walls 48, 50 define a storage area 42 of the housing 34. The housing 34 includes an opening 68 to permit access to the storage area 42. In the closed position, the sliding tray 40 covers the opening 68 and prevents access to the storage area 42. In the open position, the sliding tray 40 is removed from the opening 68 and permits access to the storage area 42 through the opening 68.

The housing 34 includes a forward portion 44 that defines a tray receiving cavity 44*a*. The tray receiving cavity 44*a* receives a portion of the sliding tray 40 when the sliding tray 40 is in the open position. In some embodiments, a portion of the sliding tray 40 is received within the tray receiving cavity 44*a* when the sliding tray 40 is in the closed position; however, the portion of the sliding tray 40 received within the tray receiving cavity 44*a* in the closed position is less than the portion of the sliding tray 40 received within the tray receiving cavity 44*a* in the closed position.

In some embodiments, the forward portion 44 of the housing 34 may be configured to be integrated with the instrument panel 20. Specifically, the forward portion 44 may be extend forwardly beyond the instrument panel 20 such that the forward portion 44 is hidden from view from within the passenger compartment 12 of the vehicle 10.

In some embodiments, the pair of sidewalls 36, 38 and the pair of end walls 48, 50 extend in a vehicle vertical direction from the floor 46 beyond a portion of the sliding tray 40. The pair of sidewalls 36, 38 and the pair of end walls 48, 50 may be perpendicular to the floor 46 or may, without limitation, be in a slanting or a sloping direction with respect to the floor 46. It should be appreciated that the storage compartment 32 may have its own sidewalls and floor surface.

Each of the pair of sidewalls 36, 38 includes a track 52 formed in inner surfaces 36*a*, 38*a* of the pair of sidewalls 36, 38. The track 52 includes a generally C-shaped channel 56. Each of the channels 56 includes an upper wall portion 58, a lower wall portion 60, and a back wall portion 62. The upper wall portion 58, the lower wall portion 60, and the back wall portion 62 are arranged that the C-shaped channels 56 are open toward and in communication with the storage area 42. The channels 56 define rail receiving cavities on inner surfaces 36*a*, 38*a* of the pair of sidewalls 36, 38.

The pair of sidewalls 36, 38 may also include side garnishes 150, 152. The side garnishes 150, 152 include inner walls 150*a*, 152*a* that extend in a vehicle vertical direction downwardly towards the floor 46 of the storage area 42. The inner walls 150*a*, 152*a*, include lower edges 150*b*, 152*b* and inner surfaces 150*c*, 152*c*. The lower edges 150*b*, 152*b* may be positioned inwardly with respect to the pair of sidewalls 36, 38. The lower edges 150*b*, 152*b* may extend downwardly towards the floor 46 beyond a portion of the track 52. In some embodiments, the lower edges 150*b*, 152*b* may extend downwardly below the upper wall portions 58 of the channels 56. The inner surfaces 150*c*, 152*c* face inwardly in the vehicle lateral direction, specifically, the inner surfaces 150*c*, 152*c* face the storage area 42.

Figure 3:
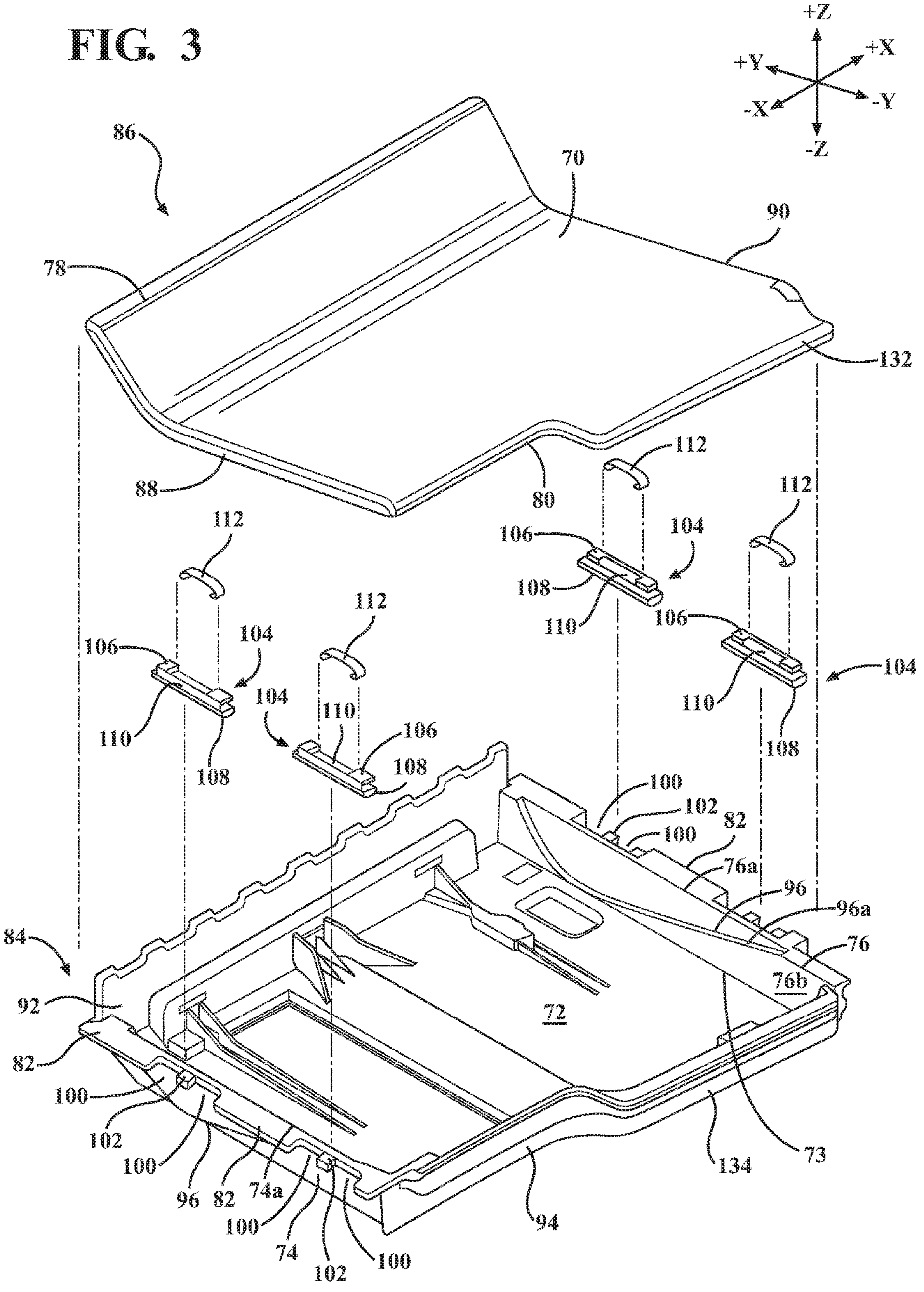
FIG. 3 schematically depicts an exploded view of the sliding tray of FIG. 2, according to one or more embodiments described and illustrated herein FIG. 4 schematically depicts a side view of a sliding tray of the storage compartment of FIG. 2 in isolation, according to one or more embodiments described and illustrated herein.
Figure 4:
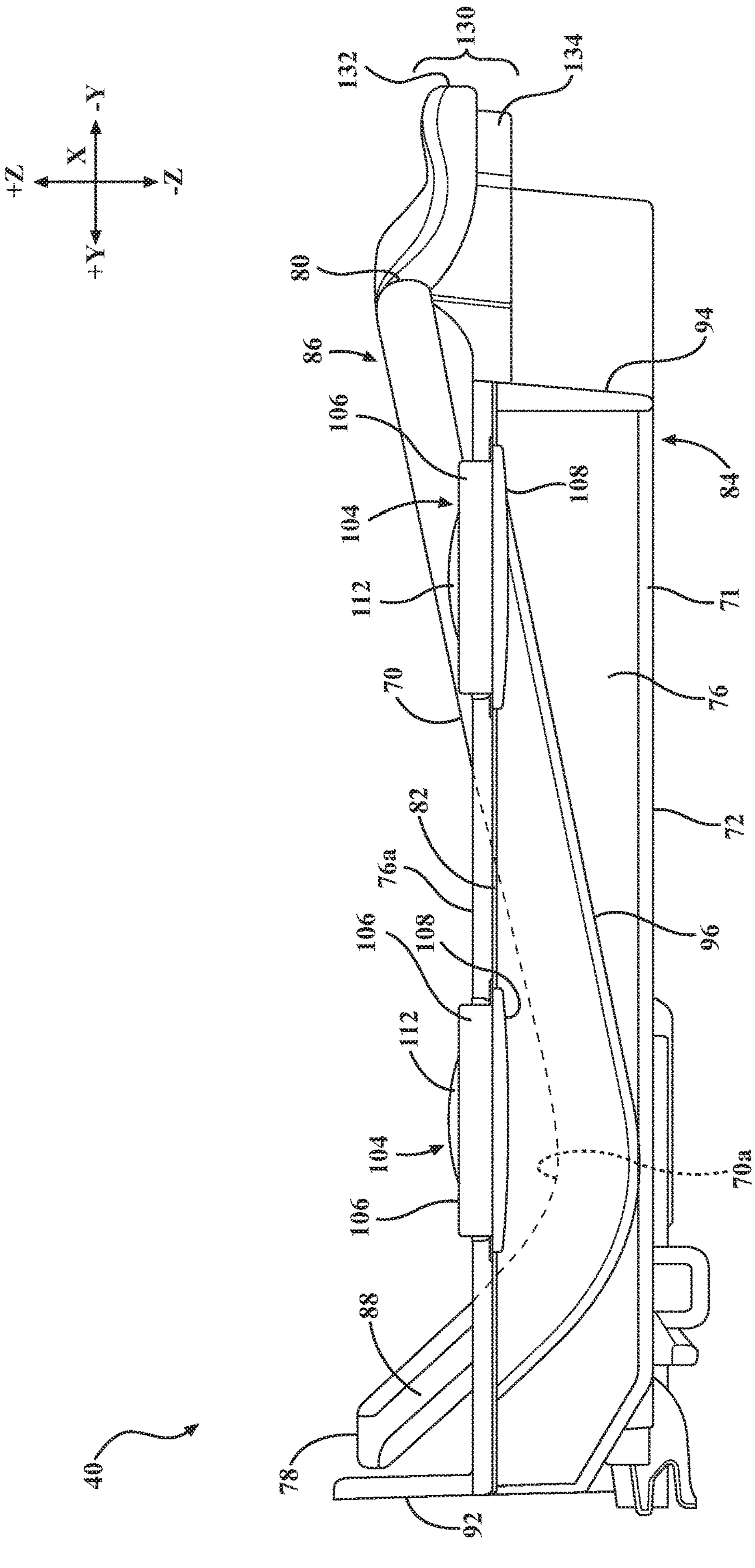

Referring to FIGS. 3, 4, and 5, the sliding tray 40 includes a tray cover 86 and a tray body 84. The tray body 84 includes a bottom wall 72, a front wall 92, an opposite rear wall 94 and a pair of sidewalls 74, 76 that extend between the front wall 92 and the rear wall 94. Specifically, the bottom wall 72 includes side edges 71, 73 and the pair of sidewalls 74, 76 extend upwardly from the side edges 71, 73 of the bottom wall 72.

Each of the pair of sidewalls 74, 76 includes a rail 82 that extends outwardly from a distal end 74*a*, 76*a* of the pair of sidewalls 74, 76. The rails 82 may extend generally perpendicular to the each of the pair of sidewalls 74, 76. As will be described in greater detail below, a portion of the sidewalls 74, 76 extends upwardly in the vehicle vertical direction beyond a portion of the tray cover 86.

The distal ends 74*a*, 76*a* of the pair of sidewalls 74, 76 are positioned above the bottom wall 72 of the tray body 84 in the vehicle vertical direction. As will be discussed in greater detail below, the rails 82 engage with the track 52 on each of the pair of sidewalls 36, 38 of the housing 34 to permit the sliding tray 40 to slide with respect to the housing 34.

In some embodiments, each of the rails 82 of the tray body 84 may include at a notch 100. The notches 100 extend inward into the rail 82 and may be generally rectangular in shape. A portion of the rail 82 forms the sides of the notches 100. A tab 102 projects outwardly from at least one of the sides of the notches 100. It should be appreciated that the tab 102 may be rigid or flexible, and may be made of the same material as the tray body 84 or any other suitable material. The notches 100 and tab 102 are configured to accept a spring retainer 104.

The spring retainer 104 includes a base 106 and a biasing member 112. The base 106 has a bottom surface 108 and a cutout 110. The biasing member 112 is positioned within the cutout 110. The bottom surface 108 has a curvilinear shape. As shown in FIG. 4, a portion of the biasing member 112 extends upwardly beyond the base 106. In some embodiments, the biasing member 112 is a spring for example a leaf spring. The spring retainers 104 engage with the notches 100 to secure the spring retainers 104 to the rails 82.

In some embodiments, the tray body 84 may have a pair of spring retainers 104 or two pairs of spring retainers 104. At least one spring retainer 104 is connected to each of the rails 82 of the tray body 84. As will be described in greater detail below, the spring retainers 104 aid in the sliding movement of the sliding tray 40 with respect to the housing 34.

A rib 96 extends inwardly from inner surfaces 74*b*, 76*b* of the pair of sidewalls 74, 76 of the tray body 84. The rib 96 extends inwardly from the inner surfaces 74*b*, 76*b* to form a ledge 96*a*. As will be described in greater detail below, the ribs 96 have ledges 96*a* that are configured to accept the tray cover 86. The ribs 96 may have a curvilinear shape to match a generally curvilinear shape of the tray cover 86.

Still referring to FIGS. 3, 4, and 5, the tray cover 86 includes an upper storage surface 70. The tray cover 86 is disposed above the bottom wall 72 of the tray body 84. The tray cover 86 includes a first end 78, an opposite second end 80, and a pair of opposing side edges 88, 90. The pair of opposing side edges 88, 90 extend from the first end 78 to the second end 80.

In some embodiments, the upper storage surface 70 of the tray cover 86 is formed having a generally arcuate or curvilinear shape. In some other embodiments, the tray cover 86 is formed having a generally arcuate or curvilinear shape. It should be appreciated that while the tray cover 86 is generally depicted as having an arcuate shape, other shapes of the top surface are conceivable.

In some embodiments, the tray cover 86 is formed as a separate structure from the tray body 84. The tray cover 86 is inserted into the tray body 84 such that the side edges 88, 90 of the tray cover 86 are positioned between the inner surfaces 74*b*, 76*b* of the sidewalls 74, 76 of the tray body 84. As shown in FIG. 5, the side edges 88, 90 of the tray cover 86 are positioned inwardly of the inner surfaces 74*b*, 76*b* of the sidewalls 74, 76 of the tray body 84. In some embodiments, the side edges 88, 90 of the tray cover 86 abut the inner surfaces 74*b*, 76*b* of the sidewalls 74, 76 of the tray body 84. In some other embodiments, the side edges 88, 90 of the tray cover 86 are affixed to the inner surfaces 74*b*, 76*b* of the sidewalls 74, 76 of the tray body 84. For example, an adhesive or ultrasonic welding may be used to affix the side edges 88, 90 of the tray cover 86 to the inner surfaces 74*b*, 76*b* of the sidewalls 74, 76 of the tray body 84.

In some embodiments, a lower surface 66 of the tray cover 86 adjacent the side edges 88, 90 contacts the ledges 96*a* of the ribs 96 to position the tray cover 86 with respect to the tray body 84. The lower surface 66 of the tray cover 86 may be affixed to the ledges 96*a* of the ribs 96 to secure the tray cover 86 to the tray body 84. For example, an adhesive or ultrasonic welding may be used to affix the lower surface 66 of the tray cover 86 to the ledges 96*a* of the ribs 96 of the tray body 84.

As shown in FIG. 4, a lowermost portion 70*a* of the upper storage surface 70 is positioned below a portion of the sidewalls 74, 76. Specifically, the lowermost portion 70*a* of the upper storage surface 70 is positioned below the rails 82 and the distal ends 74*a*. 76*a* of the sidewalls 74, 76. Stated differently, the pair of sidewalls 74, 76 extend upwardly from the side edges 71, 73 of the bottom wall 72 upwardly beyond a portion of the upper storage surface 70. As such, objects placed on the upper storage surface 70 are prevented from falling off the side edges 88, 90 of the upper storage surface 70 due to the pair of sidewalls 74, 76 extending above a portion of the upper storage surface 70. Specifically, objects on the upper storage surface 70 would contact the inner surfaces 74*b*, 76*b* of the sidewalls 74, 76 and be prevented from falling off the side edges 88, 90 of the tray cover 86.

In some embodiments, the first end 78 and the second end 80 of the tray cover 86 may be positioned above the tray body 84. Specifically, the first end 78 and the second end 80 of the tray cover 86 are positioned above the sidewalls 74, 76 of the tray body 84. By providing the upper storage surface 70 with the lowermost portion 70*a* positioned below the rails 82 and the distal ends 74*a*, 76*a* and the first end 78 and the second end 80 of the tray cover 86 positioned above the rails 82 and the distal ends 74*a*, 76*a*, small objects are retained in an area proximate the lowermost portion 70*a* of the upper storage surface 70 between the inner surfaces 74*b*, 76*b* of the sidewalls 74, 76.

A handle 130 is formed in the sliding tray 40. In some embodiments, the handle 130 is a two piece assembly that is formed from an upper member 132 and a lower member 134. The upper member 132 is a portion of the tray cover 86 extending rearwardly beyond the second end 80. The lower member 134 is a portion of the tray body 84 extending rearwardly beyond the rear wall 94 of the tray body 84. In some other embodiments, the handle 130 is formed only of the upper member 132 or the lower member 134.

Referring to FIG. 5, the engagement of the sliding tray 40 with the housing 34 will be discussed in detail. The sliding tray 40 is provided within the housing 34 such that a portion of the sliding tray 40 is positioned between the inner surfaces 36*a*, 38*a* of the sidewalls 36, 38 of the housing 34. The sliding tray 40 is positioned within the housing 34 such that a portion of the bottom wall 72 is provided above the floor 46 of the housing 34.

In order for the sliding tray 40 to slide with respect to the housing 34, a portion of the rails 82 are slidingly received within the track 52 to allow the sliding tray 40 to slide with respect to the housing 34. The rails 82 of the tray body 84 extend outwardly into the track 52. Specifically, a portion of the rails 82 are positioned so as to extend into the channel 56 between the upper wall portion 58 and the lower wall portion 60 of the channel 56. The position of the rails 82 within the channels 56 of the track 52 allow the sliding tray 40 to slide with respect to the housing 34.

In some embodiments, the spring retainers 104 may be positioned within the channels 56 of the track 52. Specifically, the bottom surfaces 108 of the spring retainers 104 slides with respect to the lower wall portion 60 of the channels 56. The biasing member 112, which extends upwardly beyond the base 106 as shown in FIG. 4, contacts the upper wall portion 58 of the channels 56.

The spring retainers 104 are configured to provide a spring tension between the channel 56 of the track 52 and the tray body 84. The spring tension assists in removing friction between the rails 82 of the tray body 84 and the channel 56. Further, the spring tension assists in reducing noise and/or rattling of the sliding tray 40 within the housing 34 when the tray is in a static position.

As shown in FIG. 5, a portion of the upper storage surface 70 is positioned below the rails 82 and the distal ends 74*a*, 76*a* of the sidewalls 74, 76. Stated differently, the pair of sidewalls 74, 76 extend upwardly from the side edges 71, 73 of the bottom wall 72 and upwardly beyond a portion of the upper storage surface 70. As such, objects placed on the upper storage surface 70 are constrained between the side edges 71, 73 in the vehicle lateral direction, which can inhibit objects from falling off the side edges 88, 90 of the upper storage surface 70 due to the pair of sidewalls 74, 76 extending above a portion of the upper storage surface 70. Specifically, objects on the upper storage surface 70 would contact the inner surfaces 74*b*, 76*b* of the sidewalls 74, 76 and be prevented from falling off the side edges 88, 90 of the tray cover 86 into a space between the sliding tray 40 and the sidewalls 36, 38.

As such, objects provided on the upper storage surface 70 are prevented from entering a space between the sliding tray 40 and the sidewalls 36, 38 of the housing 34. Therefore, objects can be prevented from becoming lodged between the sliding tray 40 and the sidewalls 36, 38 of the housing 34 which would prevent the sliding movement of the sliding tray 40.

Still referring to FIG. 5, the inner walls 150*a*, 152*a* of the side garnishes 150, 152 extend downwardly towards the pair of sidewalls 74, 76. Specifically, the lower edges 150*b*, 152*b* are positioned above the distal ends 74*a*, 76*a* of the pair of sidewalls 74, 76. In some embodiments, a slight gap is formed between the lower edges 150*b*, 152*b* and the distal ends 74*a*, 76*a* of the pair of sidewalls 74, 76. In other embodiments, the distal ends 74*a*, 76*a* of the pair of sidewalls 74, 76 are in sliding contact with the lower edges 150*b*, 152*b* such that the distal ends 74*a*. 76*a* of the pair of sidewalls 74, 76 slide with respect to the lower edges 150*b*, 152*b*. The inner walls 150*a*. 152*a* may be positioned so as to extend generally flush with the inner surfaces 74*b*, 76*b* of the sidewalls 74, 76. The lower edges 150*b*, 152*b* are provided to extend downwardly beyond a portion of the track 52.

As such, objects provided on the upper storage surface 70 are prevented from entering a space between the sliding tray 40 and track 52 of the housing 34. Therefore, objects can be prevented from becoming lodged between the sliding tray 40 and the track 52 which would prevent the sliding movement of the sliding tray 40.

In some embodiments, the sliding tray 40 may be integrally formed as a one piece monolithic structure. Specifically, the tray body 84 and the tray cover 86 are formed as a one piece monolithic structure. In some embodiments, the sliding tray 40 may be formed as an integrally molded one piece as a one piece monolithic structure. Specifically, the tray body 84 and the tray cover 86 may be formed as an integrally molded one piece as a one piece monolithic structure.

The above described console assemblies provide storage compartments that provide a sliding tray that slides with respect to a housing. The sliding tray is configured to prevent objects on an upper storage surface of the sliding tray from being lodged between the sliding tray and sidewalls of the housing. The sliding tray includes sidewalls that extend upwardly from side edges of a bottom wall of the sliding tray beyond at least a portion of the upper storage surface. As such, objects placed on the upper storage surface contact the sidewalls that extend upwardly beyond at least a portion of the upper storage surface. Accordingly, the objects are prevented from entering a space between the sidewalls of the housing and the sliding tray by the sidewalls that extend upwardly beyond at least a portion of the upper storage surface While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A storage compartment of a console assembly for a vehicle, the storage compartment comprising:

a housing having a storage area defined by a floor, a pair of sidewalls, and a pair of end walls, the housing having an opening permitting access to the storage area, each of the pair of sidewalls includes a receiving cavity; and a sliding tray having an upper storage surface, a bottom wall, and a pair of sidewalls that extend upwardly from side edges of the bottom wall beyond at least a portion of the upper storage surface, each of the pair of sidewalls includes an outwardly extending rail that is received within the receiving cavity on each of the pair of sidewalls of the housing to permit the sliding tray to slide with respect to the housing, at least a portion of the upper storage surface extends above the receiving cavities and the outwardly extending rails.

2. The storage compartment of claim 1, wherein the upper storage surface has a generally curvilinear shape.

3. The storage compartment of claim 2, wherein the sidewalls extend upwardly above a lowermost portion of the upper storage surface.

4. The storage compartment of claim 3, wherein the rails of the pair of sidewalls are positioned above at least a portion of the upper storage surface.

5. The storage compartment of claim 4, wherein the upper storage surface includes a first end and an opposite second end, and wherein the portion of the upper storage surface that is below the rails of the pair of sidewalls is positioned between the first end and the second end.

6. The storage compartment of claim 5, wherein the first end and the second end of the upper storage surface are positioned above the rails of the sidewalls.

7. The storage compartment of claim 2, wherein the sliding tray includes a tray cover and a tray body, the tray cover includes the upper storage surface and the tray body includes the bottom wall, the pair of sidewalls, and the rails.

8. The storage compartment of claim 7, wherein the tray cover includes a pair of side edges, the tray cover is positioned on the tray body such that at least a portion of the pair of side edges of the tray cover abut interior surfaces of the sidewalls of the tray body.

9. The storage compartment of claim 8, wherein each of the sidewalls of the tray body includes a rib that extends inwardly from the interior surfaces of the sidewalls of the tray body, the tray cover contacts the ribs.

10. The storage compartment of claim 9, wherein the tray cover has a generally curvilinear shape, the ribs of the tray body have a generally curvilinear shape that corresponds to the generally curvilinear shape of the tray cover, and wherein a lower surface of the tray cover abuts the ribs of the tray body.

11. A vehicle comprising:

a passenger compartment;

a console assembly having a storage compartment within the passenger compartment;

the storage compartment comprising:

a housing having a storage area defined by a floor, a pair of sidewalls, and a pair of end walls, the housing having an opening permitting access to the storage area, each of the pair of sidewalls includes a receiving cavity; and a sliding tray having an upper storage surface, a bottom wall, and a pair of sidewalls that extend upwardly from side edges of the bottom wall beyond at least portion of the upper storage surface, each of the pair of sidewalls includes an outwardly extending rail that is received within the receiving cavity on each of the pair of sidewalls of the housing to permit the sliding tray to slide with respect to the housing, at least a portion of the upper storage surface extends above the receiving cavities and the outwardly extending rails.

12. The vehicle of claim 11, wherein the upper storage surface has a generally curvilinear shape.

13. The vehicle of claim 12, wherein the sidewalls extend upwardly above a lowermost portion of the upper storage surface.

14. The vehicle of claim 13, wherein the rails of the pair of sidewalls are positioned above at least a portion of the upper storage surface.

15. The vehicle of claim 14, wherein the upper storage surface includes a first end and an opposite second end, and wherein the portion of the upper storage surface that is below the rails of the pair of sidewalls is positioned between the first end and the second end.

16. The vehicle of claim 15, wherein the first end and the second end of the upper storage surface are positioned above the rails of the sidewalls.

17. The vehicle of claim 12, wherein the sliding tray includes a tray cover and a tray body, the tray cover includes the upper storage surface and the tray body includes the bottom wall, the pair of sidewalls, and the rails.

18. The vehicle of claim 17, wherein the tray cover includes a pair of side edges, the tray cover is positioned on the tray body such that at least a portion of the pair of side edges of the tray cover abut interior surfaces of the sidewalls of the tray body.

19. The vehicle of claim 18, wherein each of the sidewalls of the tray body includes a rib that extends inwardly from the interior surfaces of the sidewalls of the tray body, the tray cover contacts the ribs.

20. The vehicle of claim 19, wherein the tray cover has a generally curvilinear shape, the ribs of the tray body have a generally curvilinear shape that corresponds to the generally curvilinear shape of the tray cover, and wherein a lower surface of the tray cover abuts the ribs of the tray body.

* * * * *